United States Patent [19]

Inoue et al.

[11] Patent Number: 5,508,769
[45] Date of Patent: Apr. 16, 1996

[54] COLLAPSIBLE BARREL TYPE CAMERA

[75] Inventors: Takashi Inoue, Hachioji; Hiroaki Miyazaki, Tsukui, both of Japan

[73] Assignee: Olympus Optical Co., Ltd., Tokyo, Japan

[21] Appl. No.: 302,386

[22] Filed: Sep. 8, 1994

Related U.S. Application Data

[63] Continuation of Ser. No. 125,014, Sep. 21, 1993, abandoned.

[30] Foreign Application Priority Data

Sep. 22, 1992 [JP] Japan .................................. 4-253166

[51] Int. Cl.⁶ ............................................... G03B 17/04
[52] U.S. Cl. ............................................................ 354/187
[58] Field of Search ..................................... 354/187, 288, 354/195.12, 195.1

[56] References Cited

U.S. PATENT DOCUMENTS

| | | | |
|---|---|---|---|
| 4,171,894 | 10/1979 | Yamada | 354/187 |
| 4,219,265 | 8/1980 | Waaske | 354/187 |
| 4,557,574 | 12/1985 | Kohno et al. | 354/288 |
| 4,589,747 | 5/1986 | Nakayama et al. | 354/149.11 |
| 4,597,657 | 7/1986 | Wakabayashi | 354/195.12 |

FOREIGN PATENT DOCUMENTS

| | | |
|---|---|---|
| 6091338 | 5/1985 | Japan . |
| 1-255839 | of 1989 | Japan . |
| 2-50143 | of 1990 | Japan . |

Primary Examiner—M. L. Gellner
Assistant Examiner—Nicholas J. Tuccillo
Attorney, Agent, or Firm—Louis Weinstein

[57] ABSTRACT

In a collapsible barrel type camera according to the present invention, when the camera user tries to move a barrier from an opened position to a closed position when a lens barrel is protruding to a photographing position, a barrier clicking portion generates a resistance to the barrier before the barrier makes contact with a side of the lens barrel to urge the user to wait for the closing operation. A barrier switch turns off immediately before the barrier has moved to that position where it receives the resistance, and the lens barrel thereby retracts. Hence, the photographer can fully close the barrier after he or she has confirmed collapse. Further, in this camera, the provision of a complicated locking mechanism is not required between the barrier and the lens barrel. This makes the camera compact.

43 Claims, 8 Drawing Sheets

COLLAPSIBLE BARREL TYPE CAMERA

This is a continuation of U.S. application Ser. No. 08/125,014, filed Sep. 21, 1993, now abandoned.

BACKGROUND OF THE INVENTION

1. Field of the Invention

The present invention relates to a collapsible barrel type camera, and more particularly, to a barrier structure of a collapsible barrel type camera.

2. Related Art Statement

Various proposals have been made on the structure of a barrier of a collapsible barrel type camera. For example, Japanese Patent Laid-Open No. hei 1-255839 discloses the barrier structure in which extension and retraction of a photographic lens are coordinated respectively with opening and closing of the barrier and in which unlocking of the barrier is coordinated with collapse thereof.

Japanese Patent Laid-Open No. hei 2-50143 discloses the structure in which the photographic lens is extended or collapsed with a barrier interlocking switch and in which the barrier is locked when opened. The barrier is unlocked manually.

Japanese Patent Laid-Open Nos. hei 1-255839 and hei 2-50143 disclose the structures which are functionally satisfactory but which employ a complicated mechanism for interlocking a photographic lens and a barrier and are hence disadvantageous in terms of production cost and installation space.

SUMMARY OF THE INVENTION

An object of the present invention is to provide a collapsible barrel type camera which is compact and has a structure which is capable of preventing interference of a barrier with a lens barrel during the closing operation of the barrier.

To this end, the present invention provides a collapsible barrel type camera which comprises a lens barrel which is movable between a photographing protruding position and a non-photographing collapsed position, a barrier means which is movable between a fully-closed position where the barrier means covers at least a front surface of the lens barrel and a fully-opened position where the barrier means does not cover the front surface of the lens barrel, a clicking means for generating a click before a distal end portion of the barrier means makes contact with a side surface of the lens barrel when the barrier means is moved from the barrier fully-opened position toward the lens barrel located at the protruding position, and a switch means for generating a trigger signal used to collapse the lens barrel when the barrier means is moved from the fully-opened position to a position where the clicking means functions.

DETAILED DESCRIPTION OF THE PREFERRED EMBODIMENTS

Embodiments of the present invention will be described below with reference to the accompanying drawings.

Figure 1:
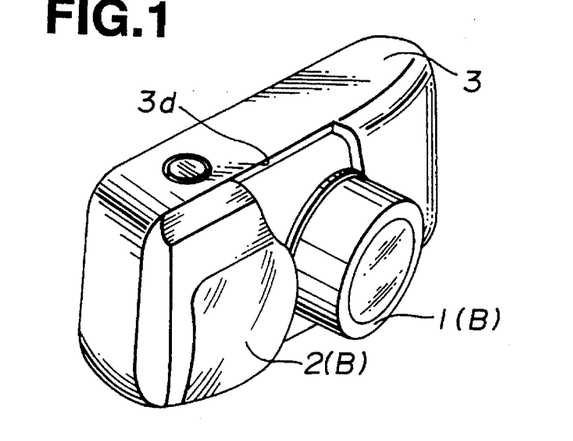
FIG. 1 is a perspective view of a first embodiment of a collapsible barrel type camera according to the present invention in a lens barrel protruding condition.
Figure 2:
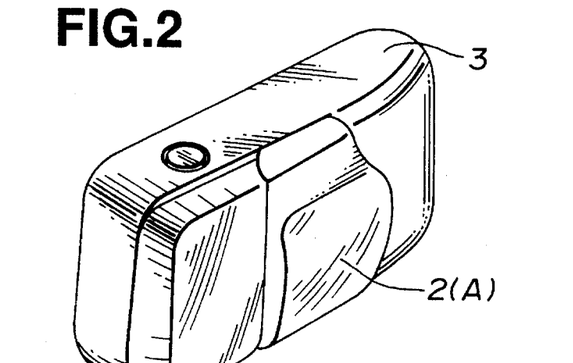
FIG. 2 is a perspective view of the collapsible barrel type camera shown in FIG. 1 in a condition where a lens barrel is collapsed and a barrier is closed.
Figure 3:
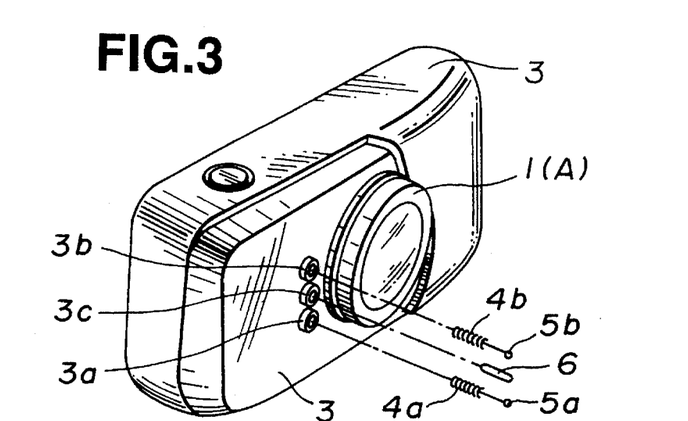
FIG. 3 is a perspective view of the collapsible barrel type camera shown in FIG. 1 in a condition where the lens barrel is collapsed and the barrier has been removed.

FIG. 1 is a perspective view of a first embodiment of a collapsible barrel type camera according to the present invention. The camera shown in FIG. 1 is in a condition where a barrier is fully opened and a lens barrel is protruding. FIG. 2 is a perspective view of the camera in a condition where the barrier is fully closed and the lens barrel is collapsed. FIG. 3 is a perspective view of the camera in a condition where the barrier has been removed from the camera shown in FIG. 2.

A barrier 2 is movable along both a barrier rail groove 3d of a front cover 3 of a camera body and a similar groove (not shown) disposed at the lower portion thereof, and can thus be moved from a closed position 2(A) shown in FIG. 2 to an opened position 2(B) shown in FIG. 1. At that time, a lens barrel 1 protrudes from a collapsed position 1(A) shown in FIG. 3 to a protruding position 1(B) shown in FIG. 1 where a picture can be taken.

As shown in FIG. 3, cylindrical boss portions 3a, 3b and 3c are provided on a camera body 3 to the left of and near the lens barrel 1. The boss portions 3a, 3b and 3c are aligned in a vertical direction. A first barrier clicking portion, which is a clicking means, is incorporated in the boss portion 3a. A second barrier clicking portion, which is a clicking means, is incorporated in the boss portion 3b. The first and second barrier clicking portions are made up of first and second clicking springs 4a and 4b and first and second clicking balls 5a and 5b, respectively. The first and second clicking balls 5a and 5b are urged in a forward direction. The boss portion 3c constitutes a barrier switch portion, which is a switch means. A switch shaft 6, which is used to operate a barrier switch 7, which will be described later, slidably passes through the barrier switch portion. The barrier switch 7 constitutes a barrier switch portion of a switch means.

Figure 4:
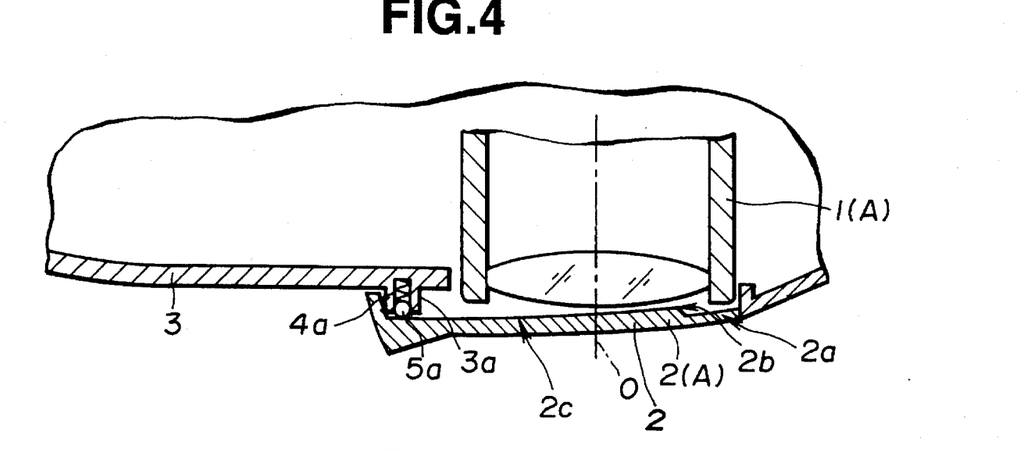
FIG. 4 is a horizontal cross-section taken along a plane which passes a first barrier click portion of the collapsible barrel type camera shown in FIG. 1 in a condition where the barrier is fully closed.
Figure 5:
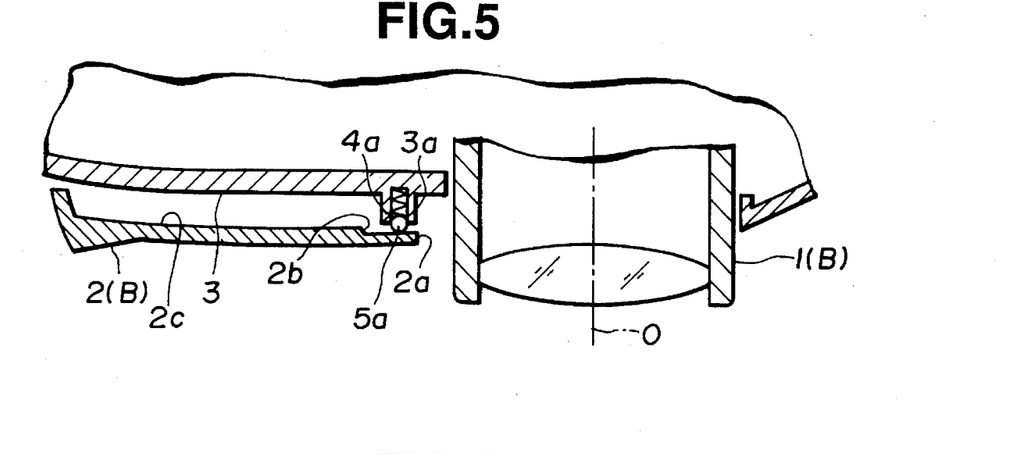
FIG. 5 is a horizontal cross-section taken along a plane which passes a first barrier click portion of the collapsible barrel type camera shown in FIG. 1 in a condition where the barrier is fully opened.
Figure 6:
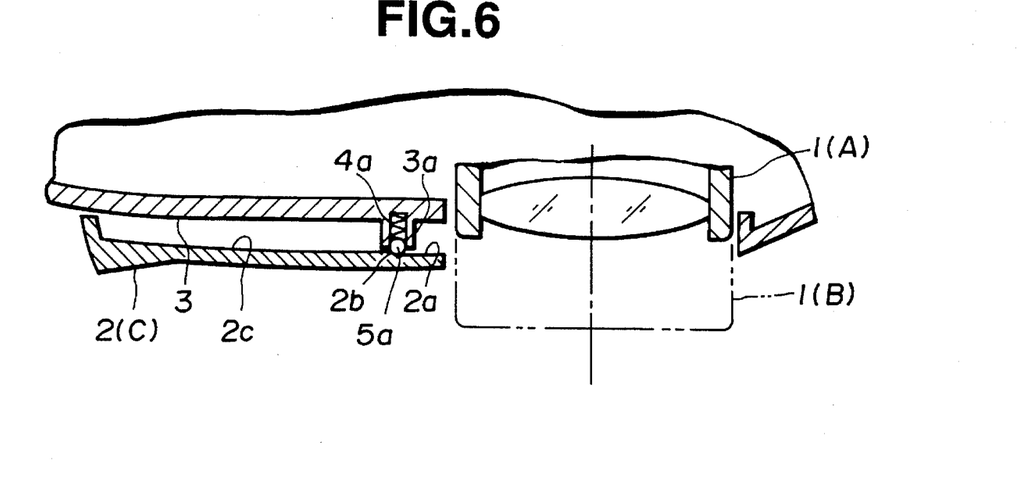
FIG. 6 is a horizontal cross-section taken along a plane which passes a first barrier click portion of the collapsible barrel type camera shown in FIG. 1 in a condition where the barrier is semi-fully opened.

FIG. 4 is a horizontal cross-section taken along a plane which passes the first barrier clicking portion shown in FIG. 3 in a fully-closed condition of the barrier 2. FIG. 5 is a horizontal cross-section taken along a plane which passes the first barrier clicking portion in a fully-opened condition of the barrier 2. FIG. 6 is a horizontal cross-section taken along a plane which passes the first barrier clicking portion in a semi-fully-opened condition of the barrier 2(which is very close to a fully-opened condition but not a completely fully-opened condition). The semi-fully-opened condition of the barrier 2 is a condition where the barrier 2 is located at a position which is almost midway between the fully-opened position 2(B) and a position where the distal end of the barrier 2 abuts against the protruding lens barrel 1 when the barrier 2 is moved in a direction in which it is closed. That position of the barrier 2 is referred to as a semi-fully-opened position 2(C).

The barrier 2 has a surface with which the click ball 5a, which is a movable member of the clicking means, makes contact. That surface has a flat surface portion 2c with which the clicking ball 5a contacts when the barrier 2 moves from the fully-closed position 2(A) to a position which is immediately before the semi-fully-opened position 2(C), an inclined surface portion 2b, which is a cam means constituting the clicking means, with which the click ball 5a contacts when the barrier 2 is located at the semi-fully-opened position 2(C), and a recessed surface portion 2a with which the click ball 5a contacts when the barrier 2 is located at the fully-opened position 2(B).

When the user moves the barrier from the fully-closed position 2(A) shown in FIG. 4 to the condition shown in FIG. 5, the barrier 2 eventually reaches the semi-fully position 2(C). At that time, the first click ball 5a presses against the barrier inclined surface portion 2b. However, no resistance is generated by the inclined surface portion 2b to the barrier 2 which is moving in a direction in which it is opened, and the user can smoothly move the barrier 2 from the fully-closed position 2(A) shown in FIG. 4 to the fully-opened position 2(B) shown in FIG. 5. Conversely, when the user moves the barrier from the fully-opened position 2(B) to the condition shown in FIG. 4, the barrier eventually reaches the semi-fully-opened position 2(C). At that time, the first click ball 5a presses against the barrier inclined surface portion 2b, generating a resistance force to the barrier which is moving in a direction in which it is closed (see FIG. 6). Accordingly, the user moves the barrier in a direction in which it is closed with a stronger force. Consequently, the barrier inclined surface portion 2b pushes in the click ball 5a, and the barrier 2 moves in a direction in which it is closed.

Figure 7:
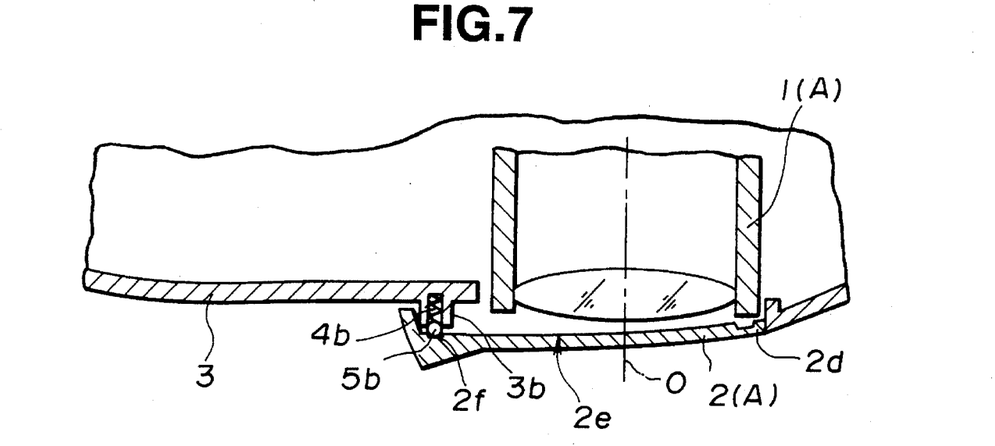
FIG. 7 is a horizontal cross-section taken along a plane which passes a second barrier click portion of the collapsible barrel type camera shown in FIG. 1 in a condition where the barrier is fully closed.
Figure 8:
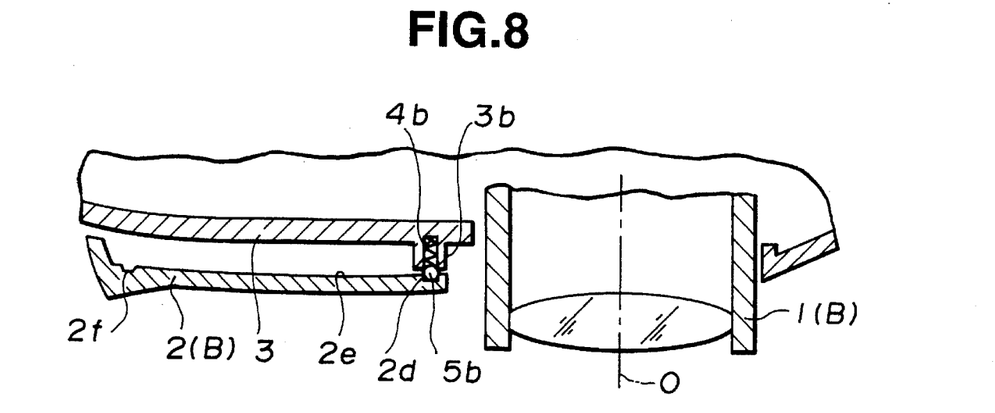
FIG. 8 is a horizontal cross-section taken along a plane which passes a second barrier click portion of the collapsible barrel type camera shown in FIG. 1 in a condition where the barrier is fully opened.
Figure 9:
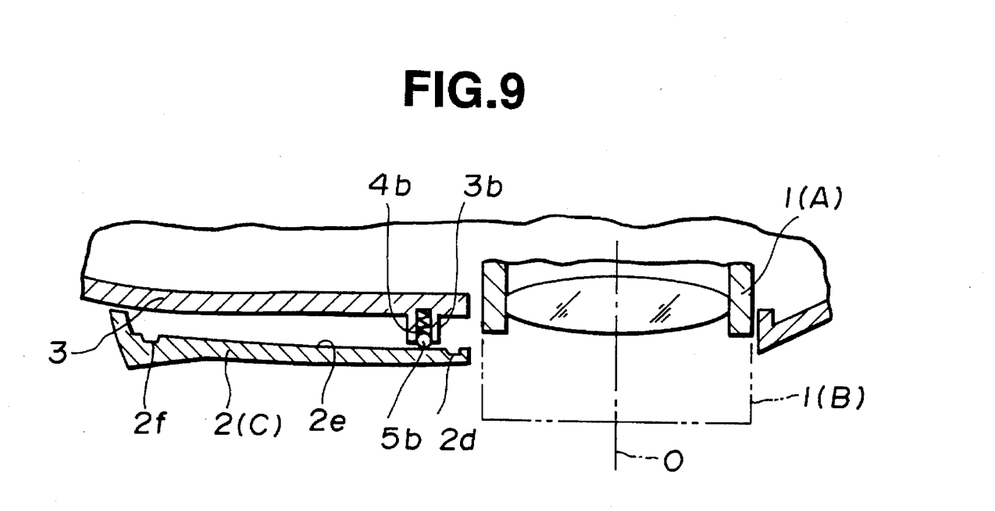
FIG. 9 is a horizontal cross-section taken along a plane which passes a second barrier click portion of the collapsible barrel type camera shown in FIG. 1 in a condition where the barrier is semi-fully opened.

FIG. 7 is a horizontal cross-section taken along a plane which passes the second barrier click portion shown in FIG. 3 in the fully-closed condition of the barrier 2. FIG. 8 is a horizontal cross-section taken along a plane which passes the second barrier click portion in the fully-opened condition of the barrier 2. FIG. 9 is a cross-section taken along the second barrier click portion in the semi-fully-opened state. The barrier positions shown in these figures respectively correspond to the barrier positions shown in FIGS. 4, 5 and 6.

In the condition shown in FIG. 7, the second click ball 5b, which is a movable member of the click means for generating a click at the fully-closed position 2(A), is pressed against a barrier recessed portion 2f, which is a cam means of the click means, by the second click spring 4b.

In the condition shown in FIG. 8, the second click ball 5b is pressed against a barrier recessed portion 2d, which is a cam means of the click means for generating a click at the fully-opened position, by the second click spring 4b. When the user closes the barrier 2 from the fully-opened position 2(B) shown in FIG. 8 with a sufficient force to push in the click ball 5b, the second click ball 5b comes out from the barrier recessed portion 2d and then slides along a flat surface portion 2e. Regarding the second barrier clicking portion, the barrier 2 moves smoothly in a region other than the fully-closed and fully-opened positions 2(A) and 2(B).

Figure 10:
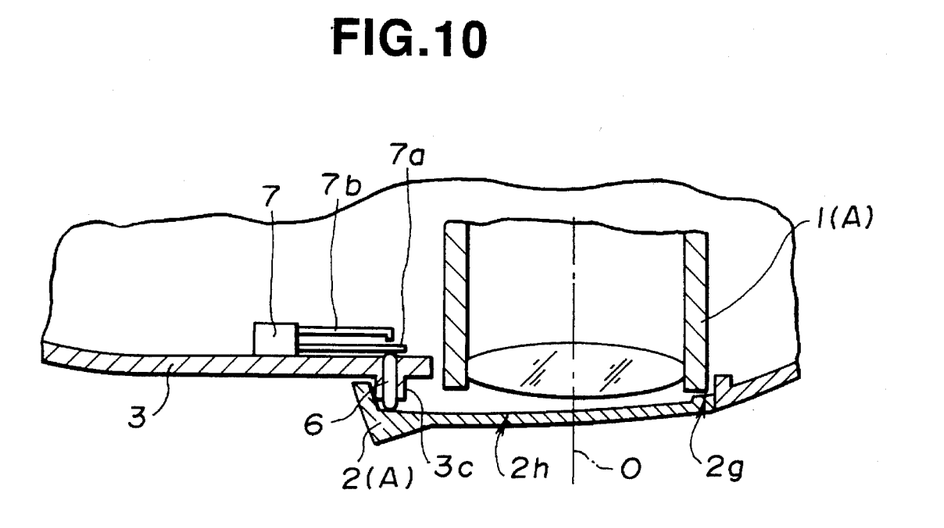
FIG. 10 is a horizontal cross-section taken along a plane which passes a barrier switch portion of the collapsible barrel type camera shown in FIG. 1 in a condition where the barrier is fully closed.
Figure 11:
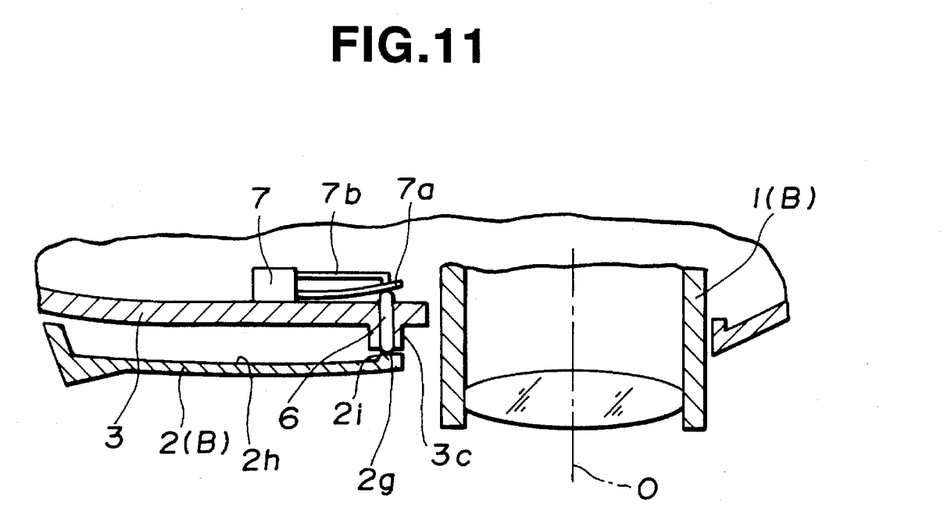
FIG. 11 is a horizontal cross-section taken along a plane which passes a barrier switch portion of the collapsible barrel type camera shown in FIG. 1 in a condition where the barrier is fully opened.

FIG. 10 is a horizontal cross-section taken along a plane which passes the barrier switch portion in the fully-closed condition of the barrier 2. FIG. 11 is a horizontal cross-section taken along a plane which passes the barrier switch portion in the fully-opened condition of the barrier 2. As mentioned above, the switch shaft 6, which is used to operate the barrier switch 7 disposed on the inner surface of the front cover 3 of the camera body, slidably passes through the boss portion 3c. The switch shaft 6 is urged forward by a movable contact 7a of the barrier switch 7. While the switch shaft 6 is in contact with an inner flat surface 2h of the barrier 2, the movable contact 7a of the barrier switch 7 is separated from a fixed contact 7b. As a result, the switch is off (see FIG. 10). As the user moves the barrier 2 in a direction in which it is opened, the switch shaft 6 makes contact with a barrier protrusion 2g, pushing in the movable contact 7a and bringing the movable contact 7a into contact with the fixed contact 7b to turn on the barrier switch 7 (see FIG. 11).

An inclined surface portion 2i of the protrusion 2g of the barrier 2 makes contact with the switch shaft 7 when the barrier has been moved to a position which is almost midway between the barrier fully-opened position 2(B) and the semi-fully-opened position 2(C), and thereby turns on or off the switch 7. When the barrier switch 7 is turned on, that on signal is sent to a control device incorporated in the camera, and the control device extends the lens barrel 1 to the protruding position 1(B) where a picture can be taken. When the barrier switch 7 is turned off, the control device, which receives that off signal, retracts the lens barrel 1 to the collapsed position 1(A) where no picture can be taken.

The barrier opening/closing operation and the lens barrel collapsing/extending operation of the collapsible barrel type camera arranged in the manner described above will be described in detail.

In a closed condition of the barrier 2, since the second click ball 5b is pressed against the barrier recessed portion 2f by the second click spring 4b, unintentional opening of the barrier 2 is prevented (see FIG. 7). When the user moves the barrier 2 in a direction in which it is opened with a sufficient force to push the second click spring 4b into a rear portion of the boss portion 3b of the front cover 3 through the second click ball 5b, the second click ball 4b comes out from the barrier recessed portion 2f, and then slides along the barrier flat surface portion 2e.

In an initial stage of the movement of the barrier in a direction in which it is opened, the first click ball 5a of the first barrier click portion is in contact with the smooth flat surface portion 2c of the barrier 2(see FIG. 4). At that time, the switch shaft 6 is also in contact with the smooth flat surface portion 2h of the barrier 2. Also, the second click ball 5b, which has come out from the barrier recessed portion 2f, is in contact with the flat surface portion 2e. Consequently, the barrier 2 moves smoothly. At that time, the barrier switch 7 is off, and the lens barrel 1 is at the collapsed position 1(A).

As the user further opens the barrier 2, the barrier 2 eventually reaches the semi-fully-opened position 2(C). At that time, the first click ball 5a reaches the barrier inclined surface portion 2b (see FIG. 6). However, since the inclined surface portion 2b does not generate a resistance to the barrier which is moving in a direction in which it is opened, the barrier 2 opens smoothly, and the first click ball 5a makes contact with the barrier recessed surface portion 2a. At that time, the barrier switch 7 is still off.

As the user further opens the barrier 2, the barrier 2 eventually reaches a position which is almost midway between the barrier fully-opened position 2(B) and the barrier semi-fully-opened position 2(C). At that time, the switch shaft 6 is pushed in by the barrier inclined surface 2i, turning on the barrier switch 7 (see FIG. 11). Consequently, the camera extends the lens barrel 1 to the protruding position 1(B).

By this time, the barrier 2 has already retracted from the path along which the lens barrel 1 is moved, and the lens barrel 1 can thus be extended smoothly. The force with which the barrier shaft 6 is brought into contact with the barrier 2 by the movable contact 7a of the barrier switch 7 is very weak. Thus, the barrier moving force required for the user to push the barrier shaft 6 through the barrier inclined surface 2i is also very weak, and it barely acts as a resistance to the user who is opening the barrier 2. Accordingly, the barrier 2 can be moved smoothly in a direction in which it is opened.

As the user further opens the barrier 2, the barrier 2 eventually reaches the barrier fully-opened position 2(B). At that time, the second click ball 5b enters the barrier recessed portion 2d, and unintentional movement of the barrier 2 in a direction in which it is closed is prevented (see FIG. 8).

Thus, after the second click ball 5b has come out from the recessed portion 2f of the barrier 2 at the fully-closed position 2(A), the carrier 2 is smoothly moved to the fully-opened position 2(B), and then the lens barrel 1 is extended to the protruding position 1(B) where a picture can be taken, thereby completing preparation for a picture taking operation.

The operation of closing the barrier 2, which is conducted after a picture has been taken, will now be described.

To collapse the lens barrel 1 and close the barrier 2, the user moves the barrier 2 from the barrier fully-opened position 2(B) in the direction in which it is closed with a sufficient force to press against and push in the second click spring 4b into the rear portion of the boss portion 3b of the front cover 3 through the second click ball 5b. Accordingly, the second click ball 5b comes out from the barrier recessed portion 2d, and comes into contact with the smooth barrier flat surface portion 2e.

As the user further moves the barrier 2 in the direction in which it is closed, the inclined surface portion 2i of the barrier 2 reaches the switch shaft 6. Since the switch shaft 6 is pressed forward by the movable contact 7a of the switch 7, it comes into contact with the barrier flat surface portion 2h. Consequently, the movable contact 7a is separated from the fixed contact 7b, thereby turning off the barrier switch 7. Upon receipt of this off signal, the control portion incorporated in the camera starts retracting the lens barrel 1 from the protruding position 1(B) to the collapsed position 1(A).

As the user moves the barrier 2 further in the direction in which it is closed, the first click ball 5a comes into contact with the barrier inclined surface portion 2b (see FIG. 6). Since the first click ball 5a is urged forward by the first click spring 4a, the urging force generated by the inclined surface portion 2b acts as a resistance to the user who is moving the barrier 2 in the direction in which it is closed, and makes the user recognize that the lens barrel 1 is being collapsed. Accordingly, the user suspends the closing operation of the barrier 2 until the lens barrel 1 completely collapses. If there is no click by the first click portion, the user may move the barrier 2 as far as the closed position 2(A). Hence, the barrier switch 7 is turned off, and the barrier 2 may make contact with the side surface of the lens barrel 1 which is not yet retracted from the moving path of the barrier 2, prohibiting the collapsing operation of the lens barrel 1. Such a failure can be overcome in this embodiment.

The user recognizes the completion of the lens barrel collapse, and moves the barrier 2 in a direction in which it is closed with a sufficient force to push in the first click ball 5a through the barrier inclined surface portion 2b. When the barrier 2 has been moved to the fully-closed position 2(A), the second click ball 5b drops in the barrier recessed portion 2f. Consequently, unintentional opening of the barrier 2 is prevented (see FIG. 7).

Figure 12:
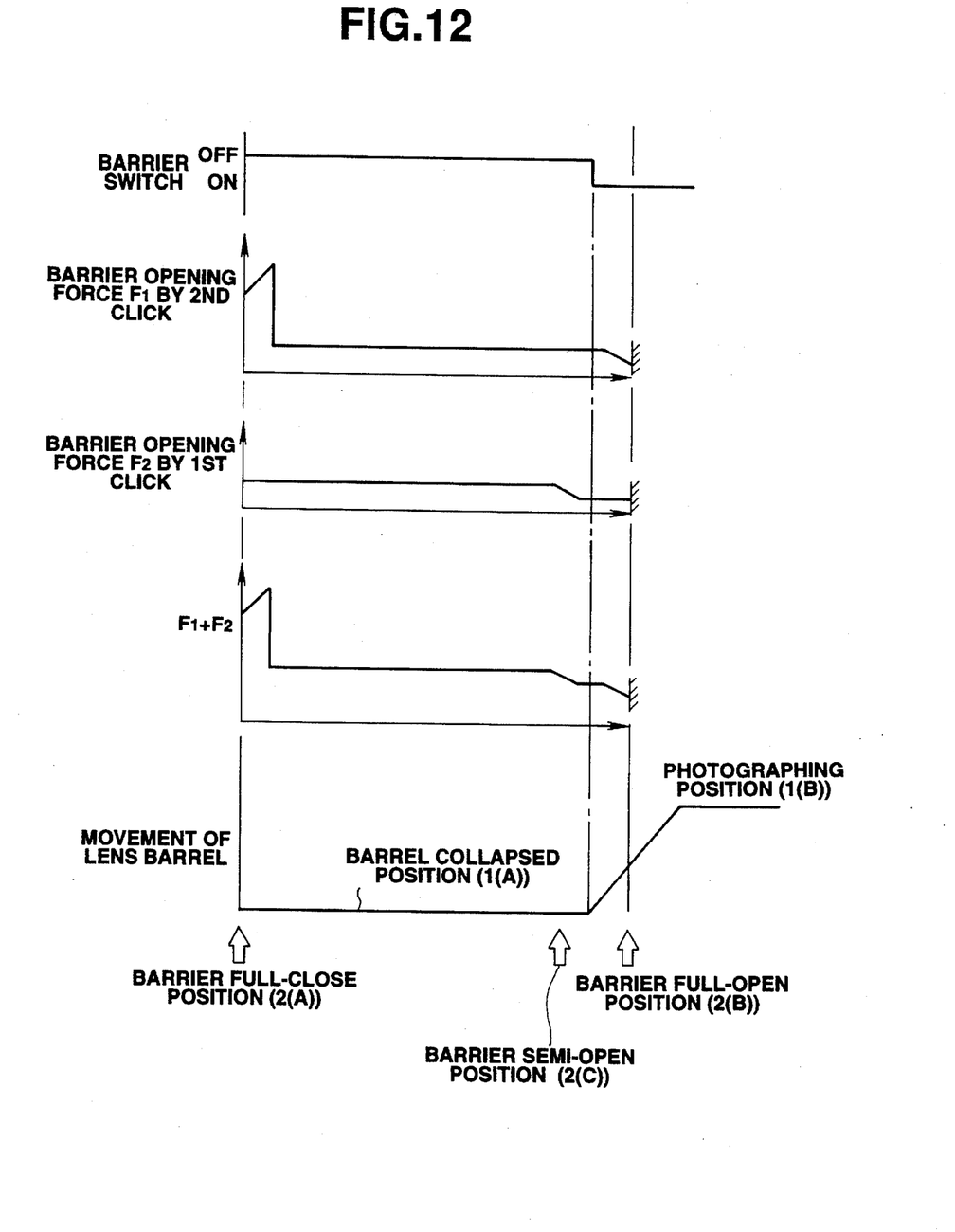
FIG. 12 is a timing chart of a barrier opening operation of the collapsible barrel type camera shown in FIG. 1.

FIG. 12 is a timing chart for the opening operation of the barrier 2. The timing chart shows on/off of the barrier switch 7 which changes according to the position of the barrier 2 which varies from the fully-closed position 2(A) to the fully-opened position 2(B), changes of the barrier opening forces F1 and F2 by the first and second click portions, changes of the barrier operating force indicated by the sum of the barrier opening forces F1 and F2, and the movement of the lens barrel 1. The influence of the switch shaft 7 on the barrier opening force is very small as compared with that of the forces by the first and second click portions, and is thus ignored.

Figure 13:
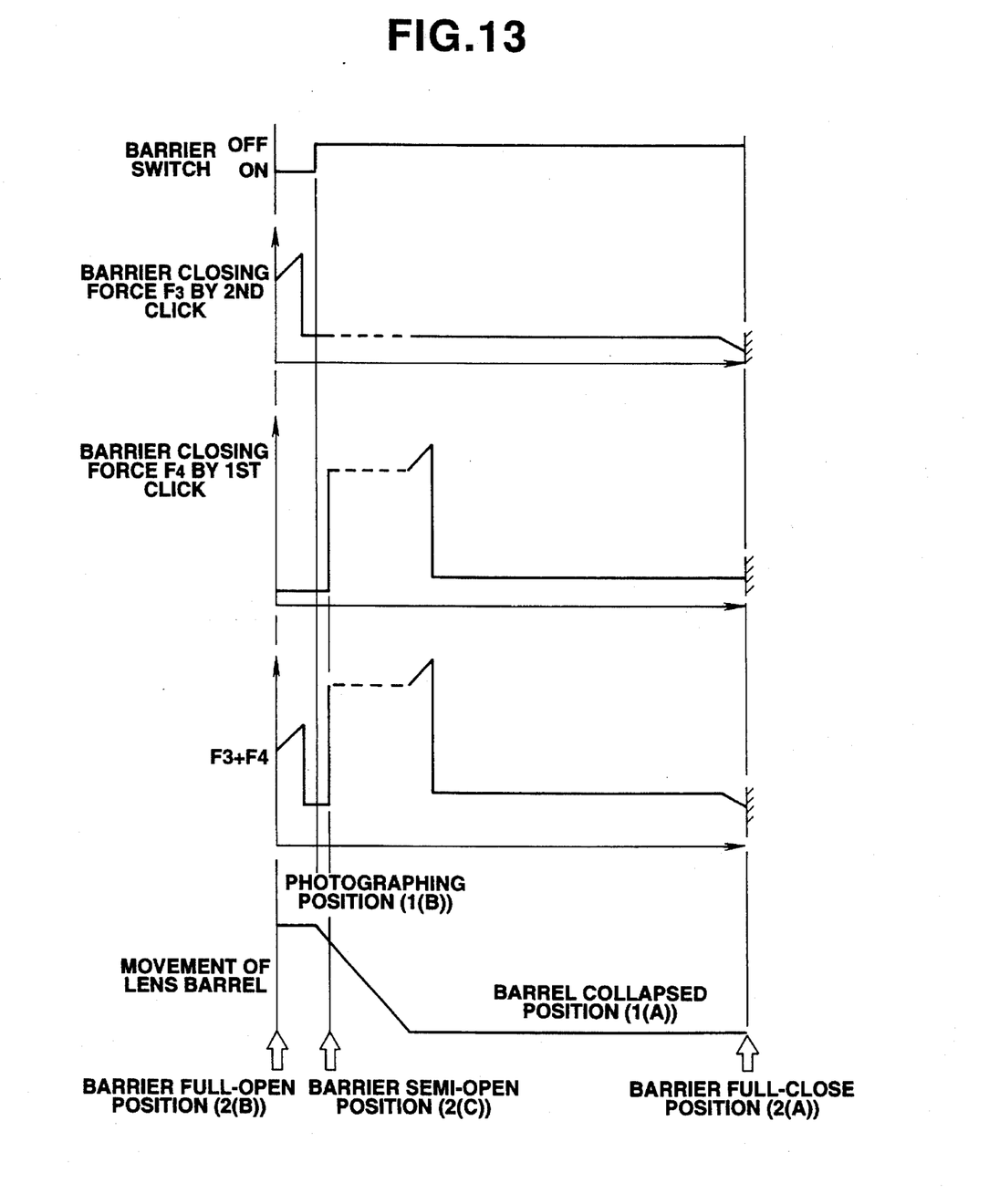
FIG. 13 is a timing chart of a barrier closing operation of the collapsible barrel type camera shown in FIG. 1.

FIG. 13 is a timing chart for the closing operation of the barrier 2. The timing chart shows on/off of the barrier switch 7 which changes according to the position of the barrier which varies from the barrier fully-opened position 2(B) to the fully-closed position 2(A) via the semi-fully-opened position 2(C), changes of the barrier closing forces F1 and F2 by the first and second click portions, and changes of the barrier operating force indicated by the sum of the barrier closing forces F1 and F2.

As mentioned above, in the collapsible barrel type camera according to the present embodiment, when the user tries to move the barrier from the opened position to the closed position when the lens barrel is protruding to the photographing position, the first barrier click portion exerts a resistance before the barrier makes contact with the side surface of the lens barrel, urging the photographer to wait for the lens barrel to collapse. Immediately before the barrier has moved to that position, the barrier switch turns off, completely collapsing the lens barrel. Further, the provision of a complicated locking mechanism is not necessary between the barrier and the lens barrel. This makes the camera compact.

A second embodiment of the collapsible barrel type camera according to the present invention will be described below.

Whereas the first embodiment employs the first and second click portions each made up of a click ball and a click spring, the second embodiment employs only one click ball and one click spring. The basic structure of the second embodiment differs from that of the first embodiment in that it does not have the second click portion and instead the barrier has a recess which acts as the second click portion.

Figure 14:
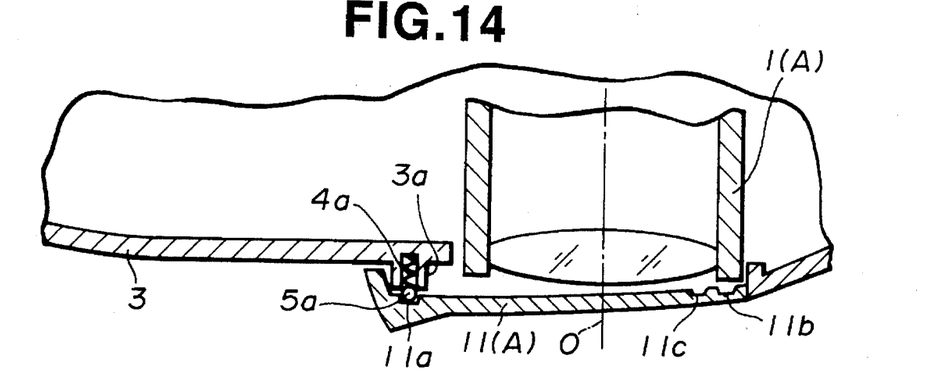
FIG. 14 is a horizontal cross-section view of a barrier click portion of a second embodiment of a collapsible barrel type camera in a condition where the barrier is fully closed.
Figure 15:
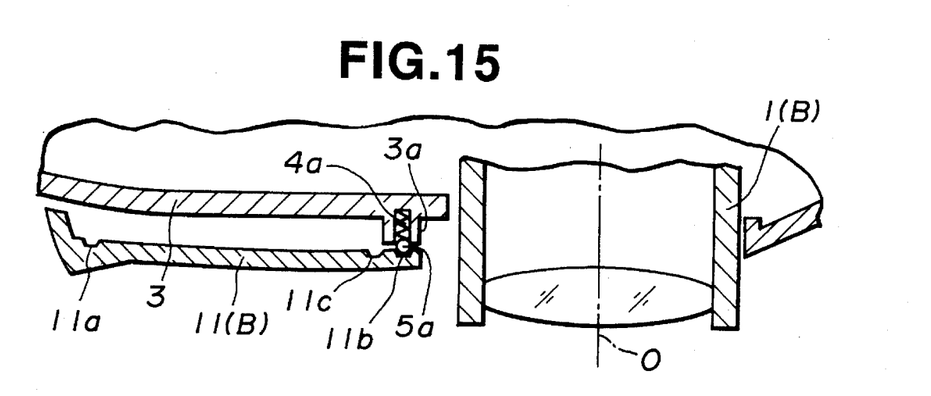
FIG. 15 is a horizontal cross-sectional view of the barrier click portion of the collapsible barrel type camera shown in FIG. 14 in a condition where the barrier is fully opened.
Figure 16:
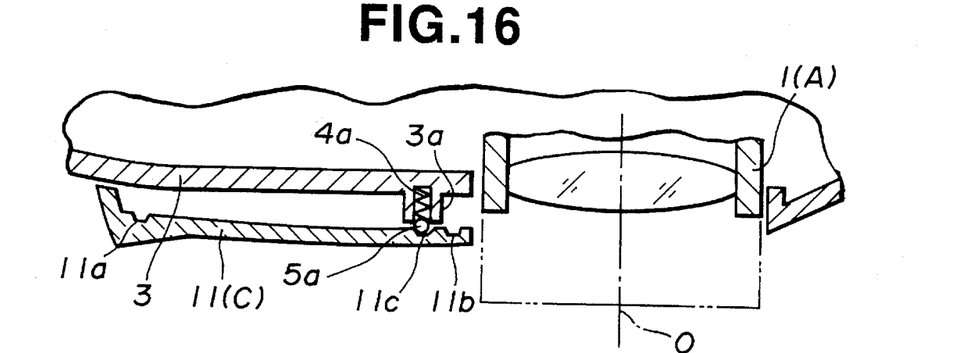
FIG. 16 is a horizontal cross-sectional view of the barrier click portion of the collapsible barrel type camera shown in FIG. 14 in a condition where the barrier is semi-fully opened.
Figure 17:
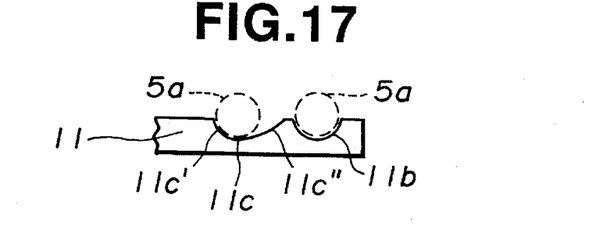
FIG. 17 is an enlarged cross-sectional view of click recessed portions for the fully-opened and semi-fully-opened positions, disposed in the barrier of the collapsible barrel type camera shown in FIG. 14.

FIG. 14 is a horizontal cross-sectional view of a barrier click portion in a condition where a barrier 11 of the camera is at a fully-closed position 11(A). FIG. 15 is a horizontal cross-sectional view of the click portion in a condition where the barrier 11 is at a fully-opened position 11(B). FIG. 16 is a horizontal cross-sectional view of the click portion in a condition where the barrier 11 is at a semi-fully-opened position 11(C). FIG. 17 is an enlarged cross-sectional view of click recessed portions 11b and 11c disposed in the barrier 11 as the fully-opened position and the semi-fully-opened position, respectively.

In this embodiment, a cylindrical boss portion 3a and a boss portion 3c (not shown) are provided on the front cover 3 of the camera on the side of the lens barrel 1, as in the case of the first embodiment. A barrier click portion, serving as a click means, is incorporated in the boss portion 3a. The barrier click portion includes a click ball 5a, which is a movable member of the click means, and a click spring 4a for urging the click ball 5a in a forward direction. As in the case of the first embodiment shown in FIGS. 11 and 12, the switch shaft 6, which is used to operate the barrier switch 7 of the barrier switch portion, serving as the switch means, passes through the boss portion 3c.

When the barrier 11 is at the fully-closed position 11(A), the click ball 5a is in a barrier recessed portion 11a, which is the cam means of the click means, preventing unintentional opening of the barrier 11 (see FIG. 14). When the barrier 11 is at the fully-opened position 11(B), the click ball 5a is in the barrier recessed portion 11b, which is the cam means, thus preventing unintentional closing of the barrier (see FIG. 15).

The barrier recessed portion 11c, which is the cam means of the barrier 11, is provided for clicking when the barrier 11 is at the semi-fully-opened position 11(C). As shown in FIG. 17, during the opening operation of the barrier 11, the click ball 5a first falls in the recessed portion 11c', and then an inclined portion 11c" presses the click ball 5a, pushing the click spring 4a inward. Conversely, during the closing operation of the barrier 11, the inclined surface 11c' pushes the click ball 5a inward. Since the inclination of the inclined surface 11c" is milder than that of the inclined surface 11c', the force generated by the recessed portion 11c during the barrier closing operation is heavier than the force generated by the recessed portion 11c during the barrier opening operation.

As mentioned above, the barrier switch 7 is provided in this embodiment, as in the case of the first embodiment, and turns on and off when the barrier 11 is at a position which is almost midway between the barrier fully-opened position 11(B) and the barrier semi-fully-opened position 11(C). These on and off signals are used to control the extending and collapsing operations of the lens barrel 1.

The barrier opening/closing operation and the lens barrel collapsing/extending operations executed in this embodiment are the same as those of the first embodiment. That is, when the user is trying to move the barrier 11 in a direction in which it is opened, the user can move the barrier 11 smoothly to the fully-opened position because of a low resistance generated by clicking at the semi-fully-opened position 11(C). Conversely, when the user is trying to move the barrier 11 in a direction in which it is closed, a larger resistance is generated by clicking to allow the user to wait at the semi-fully-opened position 11(C) for the lens barrel 1 to completely collapse. The difference in the resistance to the movement of the barrier 11 between the barrier opening and closing operations, generated near the semi-fully-opened position 11(C), is achieved by a difference in the inclination of the inclined surfaces 11c' and 11c" of the barrier recessed portion 11c.

As will be understood from the foregoing description, in the collapsible barrel type camera of this embodiment, the structure of the clicking portion disposed in the front cover 3 is simpler than that of the first embodiment. Thus, the camera of this embodiment is more advantageous in terms of the reduction in size and production cost.

A third embodiment of the collapsible barrel type camera according to the present invention will now be described.

Figure 18:
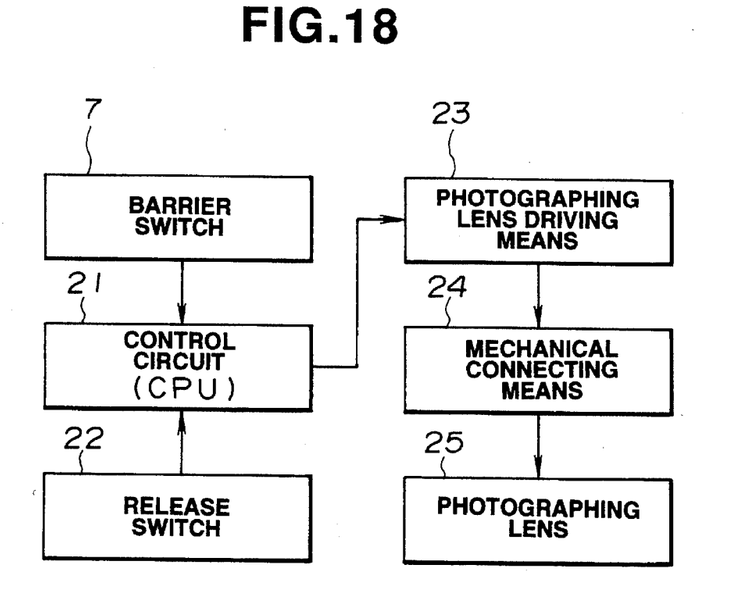
FIG. 18 is a block diagram of a control portion of a third embodiment of the collapsible barrel type camera according to the present invention.

The collapsible barrel type camera of this embodiment is constructed such that the photographic lens is covered by a barrier when no picture is taken, as in the case of the previous embodiments. FIG. 18 is a block diagram of a photographic lens driving portion of the camera of this embodiment.

The structure of the camera according to the present embodiment, including the lens barrel, the barrier clicking portion and the barrier switch, is the same as that of the first embodiment shown in FIGS. 1 through 11. Thus, reference numerals identical to those used in FIGS. 1 through 11 are used to denote such components.

As shown in FIG. 18, an on/off signal of the barrier switch 7 for detecting opening/closing of the barrier 2 is taken into a control circuit 21 constituted by a CPU. A photographic lens 25 is driven between the photographing position and the collapsed position through a photographic lens driving means 23 and a mechanical coupling portion 24 on the basis of the on/off signal of the barrier switch 7. A release signal from a release switch 22 is taken into the control circuit 21 for execution of the photographing sequence.

Figure 19:
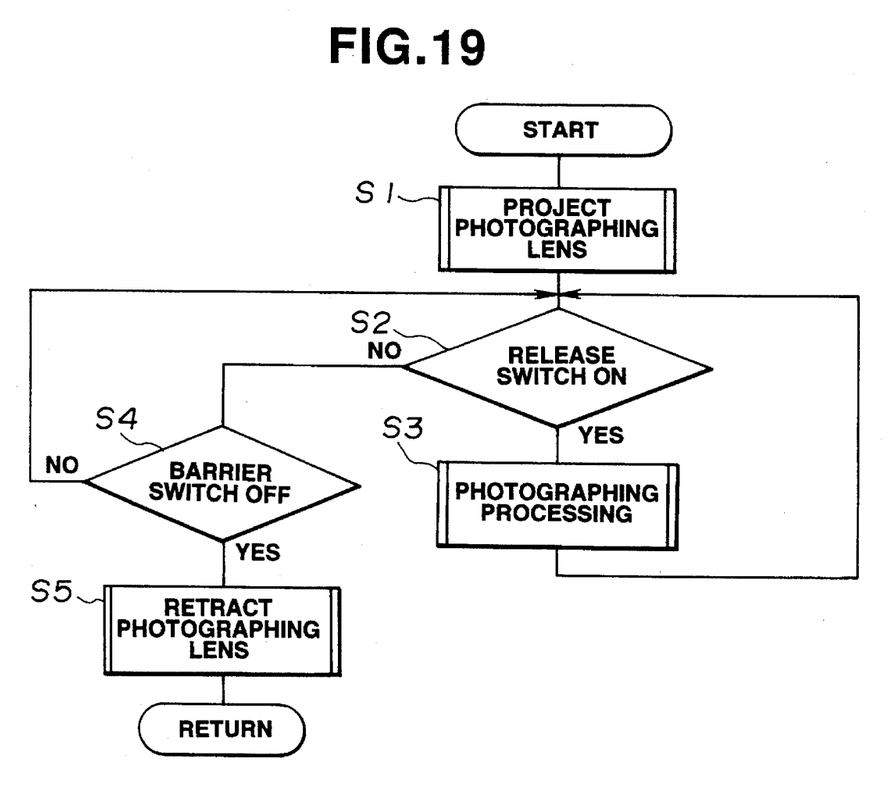
FIG. 19 is a general flowchart of the collapsible barrel type camera shown in FIG. 18.

FIG. 19 is a general flowchart of the collapsible barrel type camera of this embodiment.

When the barrier 2 is opened and the barrier switch 7 is turned on, the control circuit 21 is activated to start the processing shown in FIG. 19. In step S1, a subroutine "a photographic lens extension" is called, and extension of the lens barrel for supporting the photographic lens 25 from the collapsed position to the photographing position is executed. Subsequently, in step S2, it is determined whether the release switch 22 is on or off. If the release switch 22 is on, the process goes to step S3. If the release switch 22 is off, the process goes to step S4.

In step S3, the photographing processing, including a shutter release and a film winding, is executed. Thereafter, the process returns to step S2.

In step S4, it is determined from the condition of the barrier switch 7 whether or not the barrier 2 is held in a fully-opened condition. If the barrier 2 is in a fully-opened condition, since the barrier switch 7 is on, the process returns to step S2, and turning on of the release switch 22 is awaited.

If the barrier switch 7 is off as a consequence of the manual movement of the barrier 2 from the fully-opened position by the user and the barrier 2 is in a semi-fully-opened condition, a subroutine "photographing lens retraction" is called in step S5, and retraction of the lens barrel for moving the photographic lens 25 to the collapsed position is executed.

This retraction processing is accomplished not only by the above-described electric retraction operation but also by a mechanical operation. More specifically, when the user has moved the barrier 2 from the fully-opened position 2(B) (see FIG. 5) to the semi-fully-opened position 2(C) (FIG. 6), a resistance is generated to the barrier closing operation by the first barrier click portion. Accordingly, the operator is urged to wait for completion of the lens barrel retraction operation, i.e., of the lens barrel collapsing operation, and interference of the barrier 2 with the lens barrel can be avoided.

When retraction of the lens barrel to the collapsing position is completed, the control circuit 21 is turned off, thereby ending the routine. Accordingly, the photographer moves the barrier 2 to the fully-closed position by pushing it more strongly, and returns the camera in a non-photographing condition.

As will be understood from the foregoing description, in the collapsible barrel camera according to the present embodiment, retraction of the lens barrel to the collapsing position is initiated by the off signal of the barrier switch generated when the barrier is moved to the semi-fully-opened position during the barrier closing operation. The retraction of the lens barrel is completed while the movement of the barrier is suspended due to the resistance generated by the barrier clicking portion at the semi-fully-opened position. As a result, interference of the barrier with the lens barrel can be prevented.

What is claimed is:

1. A collapsible barrel type camera comprising:
    a lens barrel which is movable between a photographing protruding position and a non-photographing collapsed position;
    barrier means which is movable between a fully-closed position where said barrier means covers at least a front surface of said lens barrel and a fully-opened position where said barrier means uncovers the front surface of said lens barrel;
    clicking means for generating a click before a distal end portion of said barrier means makes contact with a side surface of said lens barrel when said barrier means is moved from said barrier fully-opened position toward the lens barrel located at the protruding position, said clicking means hindering movement of said barrier means toward the lens barrel; and
    switch means for generating a trigger signal used to collapse said lens barrel as said barrier means is moved from said fully-opened position to a position where said clicking means generates said click which thereby restrains said barrier as said lens barrel collapses, said switch means comprising means for generating said trigger signal before any click force hindering an already commenced movement of said barrier means toward the lens barrel is applied to said barrier means.

2. A collapsible barrel type camera according to claim 1, wherein said clicking means includes a cam means provided in said barrier means, and a movable member urged toward said barrier means relative to a camera body, said movable member being movable synchronously with the movement of said barrier means.

3. The collapsible barrel type camera according to claim 1, wherein said switch means is separate from said clicking means.

4. A collapsible barrel type camera comprising:
    a lens barrel which is movable between a photographing protruding position and a non-photographing collapsed position;
    barrier means which is movable between a fully-closed position where said barrier means covers at least a front surface of said lens barrel and a fully-opened position where said barrier means uncovers the front surface of said lens barrel;
    clicking means for generating a click before a distal end portion of said barrier means makes contact with a side surface of said lens barrel when said barrier means is moved from said barrier fully-opened position toward the lens barrel located at the protruding position;
    switch means for generating a trigger signal used to collapse said lens barrel when said barrier means is moved from said fully-opened position to a position where said clicking means generates a click and restrains said barrier as said lens barrel collapses; and
    said clicking means including means on said barrier means whereby a clicking force of said clicking means during movement of said barrier means from said fully-opened position to said fully-closed position is larger than a clicking force during movement of said barrier means from said fully-closed position to said fully-opened position, said switch means comprising means for generating said trigger signal before any click force hindering an already commenced movement of said barrier means toward the lens barrel is applied to said barrier means.

5. The collapsible barrel type camera according to claim 4, wherein said switch means is separate from said clicking means.

6. A collapsible barrel type camera comprising:
    a lens barrel which is movable between a photographing protruding position and a non-photographing collapsed position;
    barrier means which is movable between a fully-closed position where said barrier means covers at least a front surface of said lens barrel and a fully-opened position where said barrier means uncovers the front surface of said lens barrel;
    clicking means for generating a click before a distal end portion of said barrier means makes contact with a side surface of said lens barrel when said barrier means is moved from said barrier fully-opened position toward the lens barrel located at the protruding position;
    switch means for generating a trigger signal used to collapse said lens barrel when said barrier means is moved from said fully-opened position to a position where said clicking means generates a click and restrains said barrier as said lens barrel collapses; and cam means including a first cam surface for reducing a resistance to movement of said barrier means when engaged by said clicking means and said barrier means moves in a direction from said fully closed position to said fully open position and for generating a click with said barrier means and increasing a resistance to movement of said barrier means when engaged by said clicking means and said barrier means moves in a direction from said fully-opened position toward said lens barrel, said switch means comprising means for generating said trigger signal before any click force hindering an already commenced movement of said barrier means toward the lens barrel is applied to said barrier means.

7. The collapsible barrel type camera according to claim 6, wherein said switch means is separate from said clicking means.

8. A collapsible barrel type camera comprising:

a lens barrel which is movable between a photographing protruding position and a non-photographing collapsed position;

barrier means which is movable between a fully-closed position where said barrier means covers at least a front surface of said lens barrel and a fully-opened position where said barrier means uncovers the front surface of said lens barrel;

clicking means for generating a click before a distal end portion of said barrier means makes contact with a side surface of said lens barrel when said barrier means is moved from said barrier fully-opened position toward the lens barrel located at the protruding position;

switch means for generating a trigger signal used to collapse said lens barrel when said barrier means is moved from said fully-opened position to a position where said clicking means generates a click and restrains said barrier as said lens barrel collapses;

said clicking means including cam means provided in said barrier means, and a movable member urged toward said barrier means relative to a camera body, said movable member being movable synchronously with the movement of said barrier means;

said cam means including a first cam surface engaged with said movable member for reducing resistance to movement of said barrier means when said barrier means is moving from said fully-closed position to said fully-opened position and for increasing a resistance to movement of said barrier means and generating a click with said barrier means when said barrier means is moving from said fully-opened position toward said lens barrel; and said cam means further including a second cam surface for generating a click with said barrier means when said barrier means has moved to said fully-closed position, and a third cam surface for generating a click with said barrier means when said barrier means has moved to said fully-opened position.

9. The collapsible barrel type camera according to claim 8, wherein said switch means is separate from said clicking means.

10. A collapsible barrel type camera comprising:

a lens barrel which is movable between a photographing protruding position and a non-photographing collapsed position;

barrier means which is movable between a fully-closed position where said barrier means covers at least a front surface of said lens barrel and a fully-opened position where said barrier means uncovers the front surface of said lens barrel;

clicking means for generating a click before a distal end portion of said barrier means makes contact with a side surface of said lens barrel when said barrier means is moved from said barrier fully-opened position toward the lens barrel located at the protruding position;

switch means for generating a trigger signal used to collapse said lens barrel when said barrier means is moved from said fully-opened position to a position where said clicking means generates a click and restrains said barrier as said lens barrel collapses;

said clicking means including cam means provided in said barrier means, and a movable member urged toward said barrier means relative to a camera body, said movable member being movable synchronously with the movement of said barrier means; and said cam means including a first inclined cam surface engaged with said movable member for reducing resistance to movement of said barrier means when said barrier means is moving from said fully-closed position to said fully-opened position and for increasing resistance to movement of said barrier means and generating a click when said barrier means is moving from said fully-opened position toward said lens barrel, a second inclined cam surface for generating a click when said barrier means has moved to said fully-closed position, and a third inclined cam surface for generating a click when said barrier means has moved to said fully-opened position.

11. A collapsible barrel type camera according to claim 10, wherein said first inclined cam surface is set such that a force required for moving said barrier means from said fully-opened position in a fully-closed direction due to said movable member is larger than a force required for moving said barrier means from said fully-closed position to said fully-opened position due to said movable member.

12. The collapsible barrel type camera according to claim 10, wherein said switch means is separate from said clicking means.

13. A collapsible barrel type camera comprising:

a lens barrel which is movable between a photographing protruding position and a non-photographing collapsed position;

barrier means which is movable between a fully-closed position where said barrier means covers at least a front surface of said lens barrel and a fully-opened position where said barrier means uncovers the front surface of said lens barrel;

clicking means for generating a click before a distal end portion of said barrier means makes contact with a side surface of said lens barrel when said barrier means is moved from said barrier fully-opened position toward the lens barrel located at the protruding position;

switch means for generating a trigger signal used to collapse said lens barrel when said barrier means is moved from said fully-opened position to a position where said clicking means generates a click and restrains said barrier as said lens barrel collapses; and said switch means having a switch actuating shaft which is urged toward said barrier means and which is relatively movable on said cam means for pressing said switch actuating shaft so as to turn on said switch synchronously with the movement of said barrier means to an approximately intermediate position between the barrier fully-opened position and an operation position of said click means, said switch means comprising means for generating said trigger signal before any click force hindering an already commenced movement of said barrier means toward the lens barrel is applied to said barrier means.

14. The collapsible barrel type camera according to claim 13, wherein said switch means is separate from said clicking means.

15. A collapsible barrel type camera having barrier means, said camera comprising:

means for providing an increased resistance to movement of said barrier means before said barrier means moves to a side of a lens barrel which is located at a protruding position when said barrier means is moved from a fully-opened position where said lens barrel protrudes from a camera body toward a fully-closed position where said lens barrel collapses into the camera body; and switch means for generating a trigger signal to selectively protrude or collapse said lens barrel when said barrier means moves between said fully-opened position and said position where said increased resistance is provided.

16. The collapsible barrel type camera according to claim 15, wherein said switch means is separate from said clicking means.

17. A collapsible barrel type camera having a barrier means, said camera comprising:

movable shaft means urged toward said barrier means relative to a camera body and locked with a movement of said barrier means;

cam means provided in said barrier means and slidably engaging said movable member for providing an increased force upon said shaft means before said barrier means reaches a side of a lens barrel located at a protruding position when said barrier means is moved from a fully-opened position where said lens barrel protrudes toward a fully-closed position where said lens barrel collapses; and switch means responsive to movement of said barrier means for generating a trigger signal to protrude or collapse said lens barrel when said barrier means moves between said fully-opened position and said position where said increased force is provided.

18. The collapsible barrel type camera according to claim 17, wherein said switch means ms separate from said clicking means.

19. A collapsible barrel type camera having a barrier means, said camera comprising:

movable shaft means urged toward said barrier means relative to a camera body and locked with a movement of said barrier means;

cam means provided in said barrier means and slidably engaging said movable member for providing an increased force upon said shaft means before said barrier means reaches a side of a lens barrel located at a protruding position when said barrier means is moved from fully-opened position where said lens barrel protrudes toward a fully-closed position where said lens barrel collapses;

switch means responsive to movement of said barrier means for generating a trigger signal to protrude or collapse said lens barrel when said barrier means moves between said fully-opened position and said position where said increased force is provided; and said cam means including a first cam surface having a first portion for generating a first clicking force when said barrier means is moved from said fully-opened position toward said fully-closed position which is larger than a second clicking force generated by a second portion of said first cam surface when said barrier means is moved from said fully-closed position to said fully-opened position, a second cam surface for generating a click when said barrier means has moved to said fully-closed position, and a third cam surface for generating a click when said barrier means has moved to said fully-opened position.

20. A collapsible barrel type camera having barrier means, said camera comprising:

movable shaft means urged toward said barrier means relative to a camera body and locked with a movement of said barrier means;

cam means provided in said barrier means and slidably engaging said movable member for providing an increased force upon said shaft means for said barrier means reaches a side of a lens barrel located at a protruding position when said barrier means is moved from a fully-opened position where said lens barrel protrudes toward a fully-closed position where said lens barrel collapses;

switch means responsive to movement of said barrier means for generating a trigger signal to protrude or collapse said lens barrel when said barrier means moves between said fully-opened position and said position where said increased force is provided; and said cam means including a first cam surface having a first portion for generating a first clicking force when said barrier means is moved from said fully-opened position toward said fully-closed position which is larger than a second clicking force generated by a second portion of said first cam surface when said barrier means is moved from said fully-closed position to said fully-opened position, a second cam surface formed on a surface which continues from said first cam surface for generating a click when said barrier means has moved to said fully-closed position, and a third cam surface formed on a surface which continues from said first and second cam surfaces for generating a click when said barrier means has moved to said fully-opened position.

21. A collapsible barrel type camera in which a photographing lens is covered with a barrier when no picture can be taken, said camera comprising:

said barrier being manually movable between a first position where said barrier uncovers said photographing lens and a second position where said barrier covers said photographing lens; and clicking means for generating a click when said barrier has been moved to a third position between said first position and said second position, thereby preventing interference of said photographing lens with said barrier;

photographing lens driving means for driving said photographing lens such that at least part of said photographing lens is accommodated in a camera body when said camera is not in use and protrudes from said accommodated position toward a front of said camera body in a space where said barrier moves between said first and second positions in a photographing ready condition;

switch means generating an output when said barrier is between said second and third positions; and control means receiving said output of said switch means for driving said driving means such that said driving means drives said photographing lens into said camera body when said barrier moves from said first position to said second position and drives said photographing lens out of said camera body when said barrier moves from said second position to said first position, said switch means comprising means for generating said output before any click force hindering an already commenced movement of said barrier means toward the lens barrel is applied to said barrier means.

22. The collapsible barrel type camera according to claim 21, wherein said switch means is separate from said clicking means.

23. A collapsible barrel type camera in which a photographing lens is covered with a barrier when no picture is taken, said camera comprising:

said barrier being manually movable between a first position where said barrier does not cover said photographing lens and a second position where said barrier covers said photographing lens; and said photographing lens being at least partially accommodated in a camera body when said camera is not in use and protruding from said partially accommodated position toward a front of said camera body when said barrier is moved between said first and second positions in a photographing ready condition; and clicking means including a first clicking portion for holding said barrier at said first position, a second click portion for holding said barrier at said second position, and a third clicking portion for generating a click when said barrier is moved from said first position to said second position, for preventing interference of said photographing lens with said barrier; and switch means for generating a trigger signal used to collapse said lens barrel when said barrier means is moved from an open position toward said second position;

said third clicking portion including means causing a force exerted on said barrier and generated by said third clicking portion when said barrier moves from said second position to said first position to be smaller than a force exerted on said barrier and generated by said third clicking portion when said barrier moves from said first position to said second position, said switch means comprising means for generating said trigger signal before any click force hindering an already commenced movement of said barrier means toward the lens barrel is applied to said barrier means.

24. The collapsible barrel type camera according to claim 23, wherein said switch means is separate from said clicking means.

25. A collapsible barrel type camera having barrier means comprising:

holding means for holding said barrier means in a fully-opened photographing position where a lens barrel protrudes from said camera and a fully-closed non-photographing position where said lens barrel collapses into said camera;

resistance means for providing an increased resistance to a movement of said barrier means before said barrier means moves to one side of the lens barrel located at a protruding position when said barrier means is moved from a fully-opened position where said lens barrel protrudes from the camera body toward a fully-closed position where said lens barrel collapses into the camera body; and switch means for generating a trigger signal to selectively protrude or collapse said lens barrel when said barrier means moves between said fully-opened position and said position where said increased resistance is provided, said switch means comprising means for generating said trigger signal before any click force hindering an already commenced movement of said barrier means toward the lens barrel is applied to said barrier means.

26. The collapsible barrel type camera according to claim 25, wherein said switch means is separate from said clicking means.

27. A collapsible barrel type camera having barrier means comprising:

holding means for holding said barrier means in a fully-opened photographing position where a lens barrel protrudes from said camera and a fully-closed non-photographing position where said lens barrel collapses into said camera;

resistance means for providing an increased resistance to a movement of said barrier means before said barrier means moves to one side of the lens barrel located at a protruding position when said barrier means is moved from a fully-opened position where said lens barrel protrudes from the camera body toward a fully-closed position where said lens barrel collapses into the camera body;

switch means for generating a trigger signal to selectively protrude or collapse said lens barrel when said barrier means moves between said fully-opened position and said position where said increased resistance is provided; and wherein a magnitude of resistance of said resistance means applied to said barrier means is larger when said barrier means moves toward a fully-closed direction from a fully-opened position than the magnitude of resistance when said barrier means moves toward a fully-opened position from a fully-closed position, said switch means comprising means for generating said trigger signal before any click force hindering an already commenced movement of said barrier means toward the lens barrel is applied to said barrier means.

28. The collapsible barrel type camera according to claim 27, wherein said switch means is separate from said clicking means.

29. A collapsible barrel type camera having barrier means comprising:

holding means for holding said barrier means in a fully-opened photographing position where a lens barrel protrudes from said camera and a fully-closed non-photographing position where said lens barrel collapses into said camera;

resistance means for providing an increased resistance to a movement of said barrier means before said barrier means moves to one side of the lens barrel located at a protruding position when said barrier means is moved from a fully-opened position where said lens barrel protrudes from the camera body toward a fully-closed position where said lens barrel collapses into the camera body;

switch means for generating a trigger signal to selectively protrude or collapse said lens barrel when said barrier means moves between said fully-opened position and said position where said increased resistance is provided; and said holding means provided in said barrier means including a first cam surface slope providing a click when said barrier means moves to a fully-closed position, a second cam surface slope providing a click when said barrier means moves to a fully-opened position, and a movable shaft member urged by bias means toward said barrier means relative to a camera body which moves on said cam slope locking with a movement of said barrier means, said switch means comprising means for generating said trigger signal before any click force hindering an already commenced movement of said barrier means toward the lens barrel is applied to said barrier means.

30. The collapsible barrel type camera according to claim 29, wherein said switch means is separate from said clicking means.

31. A collapsible barrel type camera having barrier means comprising:

holding means for holding said barrier means in a fully-opened photographing position where a lens barrel protrudes from said camera and a fully-closed non-photographing position where said lens barrel collapses into said camera;

resistance means for providing an increased resistance to a movement of said barrier means before said barrier means moves to one side of the lens barrel located at a protruding position when said barrier means is moved from a fully-opened position where said lens barrel protrudes from the camera body toward a fully-closed position where said lens barrel collapses into the camera body;

switch means for generating a trigger signal to selectively protrude or collapse said lens barrel when said barrier means moves between said fully-opened position and said position where said increased resistance is provided; and said barrier means having a third cam surface providing increased resistance to movement of said barrier means when said barrier means moves toward said lens barrel from a fully-opened position and providing no resistance to movement of said barrier means when said barrier means moves from a fully-closed position to a fully-opened position, said switch means comprising means for generating said trigger signal before any click force hindering an already commenced movement of said barrier means toward the lens barrel is applied to said barrier means.

32. The collapsible barrel type camera according to claim 31, wherein said switch means is separate from said clicking means.

33. A collapsible barrel type camera having barrier means comprising:

holding means for holding said barrier means in a fully-opened photographing position where a lens barrel protrudes from said camera and a fully-closed non-photographing position where said lens barrel collapses into said camera;

resistance means for providing an increased resistance to a movement of said barrier means before said barrier means moves to one side of the lens barrel located at a protruding position when said barrier means is moved from a fully-opened position where said lens barrel protrudes from the camera body toward a fully-closed position where said lens barrel collapses into the camera body;

switch means for generating a trigger signal to selectively protrude or collapse said lens barrel when said barrier means moves between said fully-opened position and said position where said increased resistance is provided; and said resistance means including a first cam surface providing a click force when said barrier means is moved from a fully-opened position to a fully-closed position which is greater than a click force when said barrier means is moved from a fully-closed position to a fully-opened position, and a second cam surface providing a click when said barrier means moves to a fully-closed position and said second cam surface providing a click when said barrier means moves to a fully-opened position, said switch means comprising means for generating said trigger signal before any click force hindering an already commenced movement of said barrier means toward the lens barrel is applied to said barrier means.

34. The collapsible barrel type camera according to claim 33, wherein said switch means is separate from said clicking means.

35. A collapsible barrel type camera comprising:

a lens barrel which is movable between a photographing protruding position and a non-photographing collapsed position;

barrier means which is movable between a fully-closed position where said barrier means covers at least a front surface of said lens barrel and a fully-opened position where said barrier means uncovers the front surface of said lens barrel;

clicking means for generating a click force before a distal end portion of said barrier means makes contact with a side surface of said lens barrel when said barrier means is moved from said barrier fully-opened position toward the lens barrel located at the protruding position, said click force hindering movement of said barrier means toward the lens barrel; and switch means for generating a trigger signal used to collapse said lens barrel as said barrier means is moved from said fully-opened position to a position where said clicking means generates said click force which thereby restrains said barrier as said lens barrel collapses, said switch means comprising means for generating said trigger signal so that said lens barrel is collapsed before or at the same time the clicking means is actuated;

wherein said clicking means and said switching means are provided in separate positions which are not seen from outside of said camera.

36. The collapsible barrel type camera according to claim 24, wherein said switch means is separate from said clicking means.

37. The collapsible barrel type camera according to claim 24, wherein said clicking means is not a switch.

38. A collapsible barrel type camera comprising:

a lens barrel which is movable between a photographing protruding position and a non-photographing collapsed position;

barrier means which is movable between a fully-closed position where said barrier means covers at least a front surface of said lens barrel and a fully-opened position where said barrier means uncovers the front surface of said lens barrel;

clicking means for generating a click force before a distal end portion of said barrier means makes contact with a side surface of said lens barrel when said barrier means is moved from said barrier fully-opened position toward the lens barrel located at the protruding position, said click force hindering movement of said barrier means toward the lens barrel; and switch means for generating a trigger signal used to collapse said lens barrel as said barrier means is moved from said fully-opened position to a position where said clicking means generates said click force which thereby restrains said barrier as said lens barrel collapses, said switch means comprising means for generating said trigger signal so that said lens barrel is collapsed before or at the same time the clicking means is actuated, said switch means comprising means for generating said trigger signal before any click force hindering an already commenced movement of said barrier means toward the lens barrel is applied to said barrier means.

39. The collapsible barrel type camera according to claim 38, wherein said switch means is separate from said clicking means.

40. The collapsible barrel type camera according to claim 38, wherein said clicking means is not a switch.

41. The collapsible barrel type camera according to claim 38, wherein said switch means does not generate any click force.

42. The collapsible barrel type camera according to claim 41, wherein said switch means is separate from said clicking means.

43. The collapsible barrel type camera according to claim 41, wherein said clicking means is not a switch.

* * * * *